US008007874B2

(12) United States Patent
Nojo et al.

(10) Patent No.: US 8,007,874 B2
(45) Date of Patent: Aug. 30, 2011

(54) METHOD AND APPARATUS FOR CURING COATED FILM

(75) Inventors: Kazuhiko Nojo, Fujinomiya (JP); Shuichi Endo, Fujinomiya (JP); Daisuke Sano, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 960 days.

(21) Appl. No.: 11/909,044

(22) PCT Filed: Mar. 15, 2006

(86) PCT No.: PCT/JP2006/305616

§ 371 (c)(1),
(2), (4) Date: Nov. 12, 2007

(87) PCT Pub. No.: WO2006/098478

PCT Pub. Date: Sep. 21, 2006

(65) Prior Publication Data

US 2009/0004401 A1 Jan. 1, 2009

(30) Foreign Application Priority Data

Mar. 18, 2005 (JP) ................................ 2005-080171

(51) Int. Cl.
*B01J 19/08* (2006.01)

(52) U.S. Cl. ........................................ 427/560; 427/600

(58) Field of Classification Search .................. 427/560, 427/565, 600
See application file for complete search history.

(56) References Cited

U.S. PATENT DOCUMENTS 5,457,847 A * 10/1995 Uzawa et al. .................. 15/345
5,853,801 A * 12/1998 Suga et al. .................... 427/164
2003/0091734 A1* 5/2003 Overton et al. ............ 427/163.2

FOREIGN PATENT DOCUMENTS

CN 1262855 C 7/2006
JP 56-139176 A 10/1981
JP 5-154441 A 6/1993
JP 05154441 A * 6/1993
JP 5-186509 A 7/1993
JP 7-17365 U 3/1995

(Continued)

OTHER PUBLICATIONS

Machine Translation of JP-11-104562A, Tomoyuki et al.—"JP-11-104562 machine translation.pdf"—Apr. 1999.*

(Continued)

*Primary Examiner* — Michael Cleveland
*Assistant Examiner* — James Mellott
(74) *Attorney, Agent, or Firm* — Sughrue Mion, PLLC

(57) ABSTRACT

According to the method and the apparatus for curing a coated film of the present invention, since an ionization radiation is applied after the $O_2$ concentration in the near-surface layer within 1 mm above the surface of the coated film is adjusted to 1000 ppm or lower, the coated film can be sufficiently cured by irradiation of the ionization radiation. In other words, according to the method and the apparatus for curing a coated film of the present invention, since the $O_2$ concentration in a thin near-surface layer on the surface of a coated film is decreased, the coated film can be sufficiently cured by irradiation of an ionization radiation. As a result, the amount of inert gas supplied upon irradiation of an ionization radiation can be reduced, and downsizing and cost reduction of equipment can be achieved.

7 Claims, 10 Drawing Sheets

FOREIGN PATENT DOCUMENTS

| | | | |
|---|---|---|---|
| JP | 7-51641 | B2 | 6/1995 |
| JP | 8-152517 | A | 6/1996 |
| JP | 11-104562 | A | 4/1999 |
| JP | 11-268240 | A | 10/1999 |
| JP | 2000-343022 | A | 12/2000 |
| JP | 2002-182004 | A | 6/2002 |
| JP | 2003-34076 | A | 2/2003 |

OTHER PUBLICATIONS

CN First Office Action, dated Jul. 31, 2009, issued in corresponding CN Application No. 200680008809.2, 9 pages in English and Chinese.

* cited by examiner

METHOD AND APPARATUS FOR CURING COATED FILM

TECHNICAL FIELD

The present invention relates to a method and an apparatus for curing a coated film, and particularly to a method and an apparatus for curing a coated film, which comprises irradiating a coated film present on the surface of a substrate with an ionization radiation, thereby curing the coated film.

BACKGROUND ART

To satisfy physical properties, such as scratch resistance and hardness, of an ultrathin film coated on a substrate (film base), ultraviolet curing comprising applying an ultraviolet curable resin to a substrate and curing the resin by irradiation with ultraviolet light has been employed. Further, to promote curing by ultraviolet light, various methods have been proposed.

For example, in Patent Document 1, to facilitate curing of a coated film, an ionization radiation curable coated layer is formed and then an ionization radiation is applied with winding a substrate around a heating roll and heating to 30 to 100° C. together with the coated layer.

Further, Patent Document 2 discloses a method in which a transparent release film is applied to a coated surface in view of the fact that oxygen prevents ultraviolet curing. Patent Document 3 discloses a method of improving hardness by decreasing oxygen concentration by evacuating the target atmosphere for ultraviolet irradiation. Patent Document 4 discloses controlling the oxygen concentration in the target atmosphere for ultraviolet irradiation to 1000 ppm or lower and replacing oxygen dissolved in a coating solution with inert gas. Patent Document 5 discloses UV irradiation of a coated film formed on a base in a thickness of 0.005 to 1 μm in an $O_2$ concentration of 1000 ppm or lower. Further, Patent Document 6 discloses controlling the amount of inert gas supplied to an electron beam irradiation device in an apparatus for curing by electron beam irradiation under a reduced $O_2$ concentration. Patent Document 7 discloses a method for reducing $O_2$ concentration in both a coating zone and a UV irradiation zone. Patent Document 8 discloses an apparatus in which a uniform hardness is maintained while the consumption of inert gas is reduced. Patent Document 9 discloses a method in which cooling air is supplied while controlling the static pressure in a UV lamp so as to maintain a low $O_2$ concentration in an ultraviolet irradiation device.

As described above, it has been conventionally attempted to decrease the $O_2$ concentration in an irradiation device of ionization radiation or increase the temperature of coated film so as to facilitate curing of the coated film.

[Patent Document 1] Japanese Patent Publication No. 7-51641

[Patent Document 2] Japanese Patent Laid-Open No. 56-139176

[Patent Document 3] Japanese Patent Laid-Open No. 5-186509

[Patent Document 4] Japanese Patent Laid-Open No. 8-152517

[Patent Document 5] Japanese Patent Laid-Open No. 11-104562

[Patent Document 6] Japanese Utility Model Laid-Open 7-17365

[Patent Document 7] Japanese Patent Laid-Open 2000-343022

[Patent Document 8] Japanese Patent Laid-Open No. 11-268240

[Patent Document 9] Japanese Patent Application No. 2003-034076

DISCLOSURE OF THE INVENTION

Problems to be Solve by the Invention

However, the apparatuses in the above-described Patent Documents 1 to 9 have a problem that a sufficient effect of curing a coated film cannot be obtained. For example, in Patent Document 1, curing of a coated film cannot be completed and the curing rate increases only about 30 to 60% even under a higher ionization radiation. In Patent Document 2, because a coated film is irradiated with ultraviolet light through a release film, the intensity of the ultraviolet light is lower than that when a coated film is directly irradiated with ultraviolet light, resulting in insufficient curing of the coated film. In all of Patent Documents 3 to 9, while the $O_2$ concentration in a housing of an ultraviolet irradiation device is reduced, a coated film cannot be sufficiently cured only by reducing the $O_2$ concentration in the housing as herein described.

Consequently, in the apparatuses in Patent Documents 1 to 9, an enormous amount of inert gas is oversupplied, $O_2$ concentration is kept lower than necessary, or irradiation energy of ultraviolet light is increased. As a result, inert gas must be supplied in large quantities and large-scale equipment becomes necessary for maintaining the low $O_2$ concentration, and in addition, coated films are damaged by heat from the irradiation energy.

The present invention has been made in view of such circumstances and aims at providing a method and an apparatus for curing a coated film capable of curing a coated film efficiently and reliably.

Means of Solving the Problems

To accomplish the afore-mentioned object, a first aspect of the present invention provides a method for curing a coated film, including irradiating a coated film of an ionization radiation curable resin applied to a substrate with an ionization radiation, thereby curing the coated film, the method comprising: adjusting an $O_2$ concentration in a near-surface layer within 1 mm above a surface of the coated film 1000 ppm or lower; and irradiating the ionization radiation to the coated film after the adjusting.

The present inventors have investigated the reason why a coated film cannot be sufficiently cured and as a result, have found that a thin layer of air in which air remains unremoved is formed in an extremely limited surface area on the surface of a coated film and this layer prevents the coated film from curing upon irradiation of an ionization radiation. The present inventors have also found that an effect of curing a coated film can be obtained by adjusting the $O_2$ concentration in a near-surface layer within 1 mm above the surface of the coated film to 1000 ppm or lower. Further, the present inventors have found that for reducing the $O_2$ concentration in the near-surface layer to 1000 ppm or lower, a technique of ultrasonic treatment of the near-surface layer in an inert gas atmosphere is effective.

According to the first aspect of the present invention, since a coated film is irradiated with an ionization radiation after adjusting the $O_2$ concentration in the near-surface layer within 1 mm above the surface of the coated film to 1000 ppm or lower, a coated film can be sufficiently cured by irradiation of an ionization radiation.

A second aspect of the present invention has a feature that in the first aspect, the adjusting of the $O_2$ concentration in the near-surface layer is performed by ultrasonic treatment of the near-surface layer in an inert gas atmosphere. According to the second aspect, since air in the near-surface layer can be vibrated by applying an ultrasonic wave to the near-surface layer, the air in the near-surface layer can be smoothly replaced by inert gas and thus the $O_2$ concentration can be reduced.

A third aspect of the present invention has a feature that, in the second aspect, the ultrasonic treatment includes passing the inert gas through a slit and blowing the inert gas onto the surface of the coated film. According to the third aspect, since ultrasonic wave is generated by passing inert gas through a slit, blowing of inert gas to the near-surface layer and the ultrasonic treatment can be simultaneously performed.

A fourth aspect of the present invention has a feature that, in the third aspect, the inert gas is supplied through the slit at 0.5 to 50 $m^2$/minute per m of width. When the supply of inert gas is below the above-described range, replacement with inert gas may not be sufficient. When the supply of inert gas is above the above-described range, replacement with inert gas does not proceed well, and inert gas is consumed more than needed. Accordingly, the air in the near-surface layer can be effectively replaced by inert gas when the supply of inert gas is set to the above-described range.

A fifth aspect of the present invention has a feature that, in the third or fourth aspect, the inert gas is blown onto the surface of the coated film at a plurality of positions in the running direction of the substrate. According to the fifth aspect, since the substrate is subjected to ultrasonic treatment several times, the $O_2$ concentration in the near-surface layer can be greatly reduced.

A sixth aspect of the present invention has a feature that, in the second aspect, the aforementioned ultrasonic treatment is performed using an ultrasonic transducer and a diaphragm equipped with the ultrasonic transducer. According to the sixth aspect, since an ultrasonic wave can be transmitted from the ultrasonic transducer through the diaphragm, the air in the near-surface layer can be vibrated and replaced by inert gas.

A seventh aspect of the present invention has a feature that, in the sixth aspect, the diaphragm and the coated film have a distance of 10 mm or less and the diaphragm has an area of 300 $cm^2$/m of width or more. Using a diaphragm designed as above, the ultrasonic treatment of the near-surface layer can be effectively performed.

An eighth aspect of the present invention has a feature that, in any one of the first to seventh aspects, the surface temperature of the coated film is adjusted to 25 to 120° C. upon the irradiation of the ionization radiation. According to the eighth aspect, since the temperature is adjusted to 25 to 120° C. at which the air in the near-surface layer is easy to move upon application of an ultrasonic wave, the air in the near-surface layer can be effectively replaced by inert gas and thus the $O_2$ concentration in the near-surface layer can be rapidly reduced.

A ninth aspect of the present invention has a feature that, in any one of the first to eighth aspects, the ultrasonic wave has a sound pressure of 10 to 500 dB. By setting the sound pressure of the ultrasonic wave to the above-described range, the air in the near-surface layer can be effectively replaced by inert gas without causing an adverse effect on the coated film due to the ultrasonic wave.

A tenth aspect of the present invention has a feature that, in any one of the first to ninth aspects, the ultrasonic wave has a frequency of 10 to 500 kHz. By setting the frequency of the ultrasonic wave to the above-described range, the ultrasonic wave produces a high stirring effect to effectively replace the air in the near-surface layer with inert gas.

An eleventh aspect of the present invention has a feature that, in any one of the first to tenth aspects, the coated film has a film thickness of 10 μm or less. The present invention is effective for curing a thin coated film having a thickness of 10 μm or less, particularly 5 μm or less. Specifically, in the case of a coated film having a film thickness of 10 μm or less, no barrier layer is formed on the coated film surface when the coated film is irradiated with an ionization radiation, and so due to the presence of air in the near-surface layer, an initiator and the like once excited in the coated film is consumed before being used for curing the curable resin. In the present invention, however, the $O_2$ concentration in the near-surface layer is reduced, and this ensures sufficient curing of the coated film.

A twelfth aspect of the present invention has a feature that, in any one of the first to eleventh aspects, a coating solution for forming the coated film contains an acrylic UV curable resin or a thermosetting epoxy resin. The twelfth aspect of the present invention is effective for curing a coated film formed from a coating solution containing the above thermosetting resin.

A thirteenth aspect of the present invention has a feature that, in any one of the first to twelfth aspects, the coated film is an optically functional film such as an anti-reflection film or a view angle expansion film. The thirteenth aspect of the present invention is effective for forming a coated film which serves as such an optically functional film.

A fourteenth aspect of the present invention has a feature that, in any one of the first to thirteenth aspects, the coated film is a hardcoat layer for protecting the surface of a molded plastic plate, metal, wood, glass, cloth or plastic.

To accomplish the aforementioned object, the apparatus for curing a coated film according to a fifteenth aspect of the present invention comprises: an ultrasonic treatment device for subjecting a surface of a coated film of an ionization radiation curable resin applied to a substrate to ultrasonic treatment in an inert gas atmosphere; and an irradiation device for irradiating a near-surface layer of the ultrasonically-treated coated film with an ionization radiation.

According to the apparatus for curing a coated film of the fifteenth aspect, since the surface of the coated film is subjected to ultrasonic treatment in an inert gas atmosphere, the air in the near-surface layer of the coated film can be replaced by inert gas to reduce the $O_2$ concentration in the near-surface layer. Accordingly, upon irradiation of an ionization radiation, the coated film can be sufficiently cured.

A sixteenth aspect of the present invention has a feature that, in the fifteenth aspect, the ultrasonic treatment device has a jet nozzle for passing through a slit and blowing the inert gas onto the surface of the coated film. According to the sixteenth aspect, since an ultrasonic wave is generated by passing inert gas through a slit, blowing of inert gas to the near-surface layer and the ultrasonic treatment can be simultaneously performed.

A seventeenth aspect of the present invention has a feature that, in the fifteenth aspect, the ultrasonic treatment device has an ultrasonic transducer and a diaphragm equipped with the ultrasonic transducer. According to the seventeenth aspect, since the ultrasonic wave can be transmitted from the ultrasonic transducer through the diaphragm, the air in the near-surface layer can be vibrated and replaced by inert gas.

Advantages of the Invention

According to the present invention, since the $O_2$ concentration in the thin near-surface layer on the surface of a coated film is decreased, the coated film can be sufficiently cured by irradiation of an ionization radiation. As a result, the amount of inert gas supplied upon irradiation of an ionization radiation can be reduced, and downsizing and cost reduction of equipment can be achieved.

BEST MODE FOR CARRYING OUT THE INVENTION

In the following, preferred embodiments of the method and the apparatus for curing a coated film of the present invention are described with reference to the attached drawings.

Figure 1:
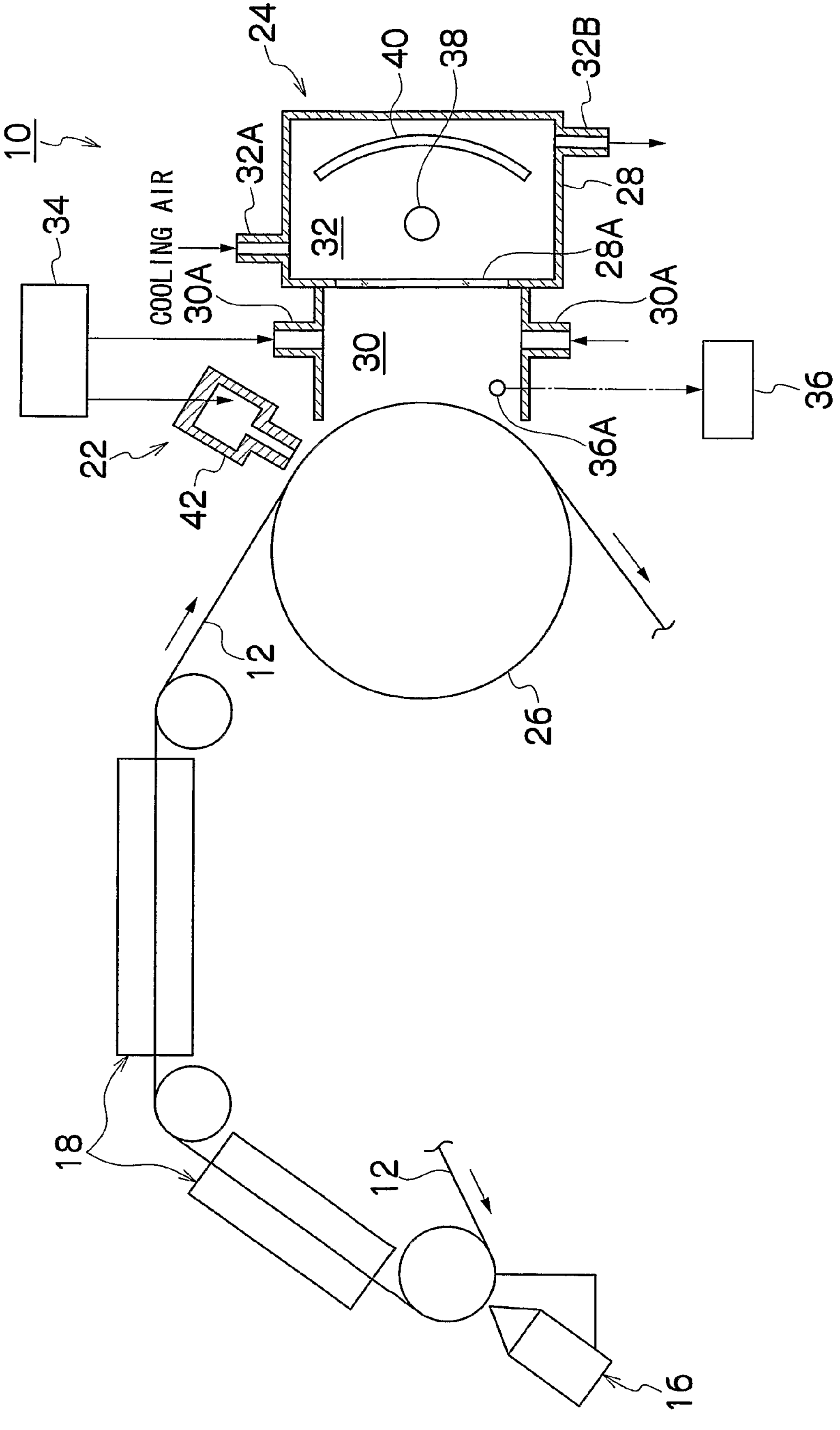
FIG. 1 is a schematic view illustrating a structure of an apparatus for producing a film in which the apparatus for curing a coated film of the present invention is used.

FIG. 1 is a schematic view illustrating a structure of an apparatus for producing a film in which the apparatus for curing a coated film of the present invention is used. The apparatus for producing a film shown in FIG. 1 is for forming a coated film on a continuously fed web substrate 12, and is mainly composed of a coating unit 16, a drying unit 18 and an apparatus 10 for curing a coated film. First, a coated film 14 (see FIG. 2) of an ionization radiation curable resin is applied to the web substrate 12 by the coating unit 16. Then, the coated film 14 on the substrate 12 is dried by the drying unit 18 and cured by irradiating with an ionization radiation by the apparatus 10 for curing a coated film of the present invention.

The apparatus 10 for curing a coated film mainly composed of an irradiation device 24 for irradiating the coated film 14 on the substrate 12 wound over and held by a coating roller (also referred to as a back-up roller) 26 with an ionization radiation and an ultrasonic treatment device 22 positioned in the upstream of the irradiation device 24 in the running direction of the substrate 12.

The inside of the housing 28 of the irradiation device 24 is divided into an irradiation chamber 30 and a lamp room 32, and the partition between the irradiation chamber 30 and the lamp room 32 has an window 28A composed of transparent glass or plastic.

The irradiation chamber 30 has an opening on the side of the coating roller 26, and the edge of the chamber is positioned in a small distance from the substrate 12. The irradiation chamber 30 also has inert gas inlets 30A, 30A on the top and the bottom, which are connected to an inert gas supply unit 34. Accordingly, by supplying inert gas from the inert gas supply unit 34, the irradiation chamber 30 can be filled with the inert gas. Referring to the inert gas, Ne, Ar, He, $N_2$ or $CO_2$ may be used, and $N_2$ and $CO_2$ are particularly preferred in view of the cost. Regarding the concentration of the inert gas, the purity of the gas is preferably 99.9% or higher, more preferably 99.99% or higher, further preferably 99.9999% or higher.

A sensor portion (or a suction nozzle) 36A of an $O_2$ analyzer 36 is put inside the irradiation chamber 30. The inert gas supply unit 34 controls the supply of inert gas based on the value measured by the $O_2$ analyzer 36. This configuration makes it possible to control the $O_2$ concentration inside the irradiation chamber 30 to the desired level.

On the other hand, a lamp 38 and a reflection board 40 are disposed in the lamp room 32. The reflection board 40 is positioned on the opposite side of the window 28A across the lamp 38 and is shaped like a circular arc with the top and the bottom being curved toward the lamp 38. Accordingly, when the lamp 38 is turned on, the reflection board 40 allows an ionization radiation such as ultraviolet light emitted from the lamp 38 to be focused on the side of window 28A, whereby a high energy ionization radiation can be applied to the inside of the irradiation chamber 30 through the window 28A.

The lamp room 32 has an inlet 32A and an outlet 32B for cooling air. By supplying cooling air to the inside of the lamp room 32 through the inlet 32A and discharging the air through the outlet 32B, the temperature increase in the lamp room 32 can be prevented.

With the irradiation device 24 configured as above, the coated film 14 on the substrate 12 is irradiated with an ionization radiation when the substrate 12 is transferred through the irradiation chamber 30, whereby the coated film 14 is cured.

Next, the first embodiment of the ultrasonic treatment device 22 is described. The ultrasonic treatment device 22 according to the first embodiment is a slit injection type device which generates ultrasonic wave by blowing inert gas, and has a head 42 for blowing inert gas.

Figure 2:
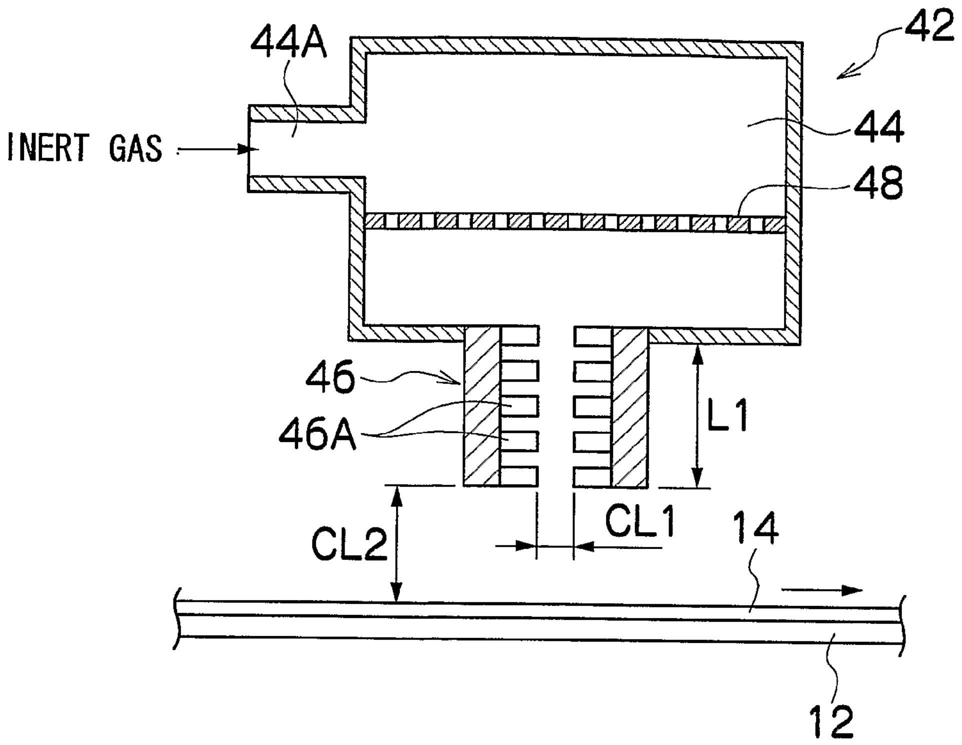
FIG. 2 is a structural view illustrating a first embodiment of an ultrasonic treatment device.

As shown in FIG. 2, the head 42 is composed of an air supply box 44 and a jet nozzle 46 attached to the air supply box 44. The jet nozzle 46 is positioned toward the coated film 14 on the substrate 12. It is preferred that the blowing direction of the jet nozzle 46 is perpendicular to the coated film 14, but the direction is not particularly limited.

The air supply box 44 has an inlet 44A to which the inert gas supply unit 34 described above (see FIG. 1) is connected. Based on this structure, inert gas can be supplied to the air supply box 44. The higher the concentration of the inert gas, the more effectively the replacement reaction described later can be performed. The purity of the gas is 99.9% or higher, more preferably 99.99% or higher, further preferably 99.9999% or higher.

A current plate 48 made of a perforated plate is disposed inside the air supply box 44. The current plate 48 is placed between the inlet 44A and the jet nozzle 46, and evenly arranges the flow of inert gas supplied from the inlet 44A in the width direction, and the gas is supplied to the jet nozzle 46. A plurality of inlets 44A may be provided in the width direction so as to supply the inert gas evenly in the width direction.

The jet nozzle 46 is shaped like a slit having the same cross sectional shapes in the width direction, and the clearance CL1 of the slit is set to 1 mm or less. The length L1 of the slit is set to several cm, and the length of the slit in the width direction is set equal to or slightly longer, e.g., about 10% longer, than the width of the substrate 12. In the inside of the slit, projections 46A, 46A of several mm or less are disposed at a regular pitch of several mm or less. The projections 46A, 46A . . . may also be randomly disposed.

Preferably, the jet nozzle 46 may be positioned so that the tip is as close as possible to the coated film 14. The clearance CL2 between the tip of the jet nozzle 46 and the substrate 12 is set to 0.1 mm to 10 mm, preferably 0.3 to 5 mm, further preferably 0.5 mm to 3 mm depending on the output of the ultrasonic wave. When the clearance CL2 is greater than the above-described range, the replacement of the air in the near-surface layer by the inert gas due to the ultrasonic wave is insufficient. When the clearance CL2 is smaller than the above-described range, the tip of the jet nozzle 46 may touch the coated film 14 and damage the coated film 14. Thus, when the clearance CL is set to the above-described range, a great advantage based on the ultrasonic treatment can be obtained without damaging the coated film 14.

With the ultrasonic treatment device 22 configured as above, an ultrasonic wave can be generated by blowing inert gas through the jet nozzle 46. The generated ultrasonic wave may have a single frequency or a broad frequency distribution, and the device is designed so that the frequency is 10 to 500 kHz.

Instead of the above-described head 42, an ultrasonic wave duster made by Shinko Co., Ltd. may be used while supplying inert gas thereto. In that case, duster may be used as is while recovering the inert gas, or it may be used without recovering the inert gas.

Figure 3:
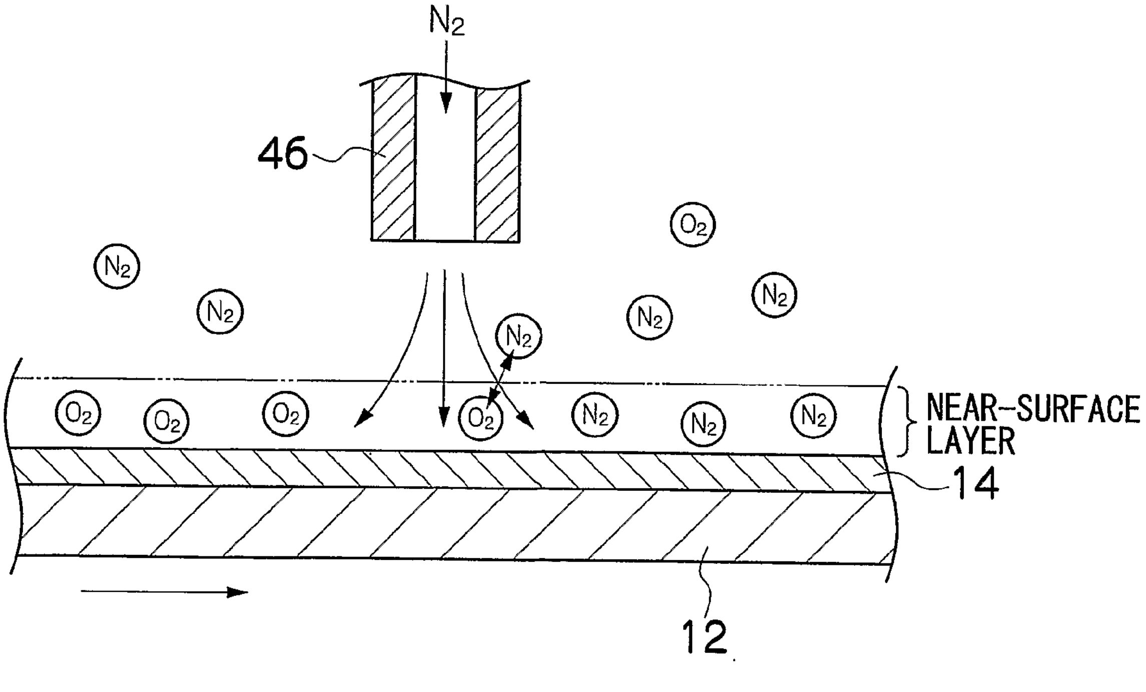
FIG. 3 is an explanatory view illustrating the action of the present invention.

Next, the action of the apparatus 10 for curing a coated film configured as above is described with reference to FIG. 3.

The thermosetting resin in the coated film 14 is cured by irradiation of an electron beam or an ionization radiation with the help of an initiator etc. also contained in the coated film 14. While this curing is generally based on a radical reaction, when oxygen is present, oxygen molecules react with generated radicals, inhibiting the radical reaction. In other words, not only electron beam or ionization radiation which reaches the film surface reduces because part of the electron beam or the ionization radiation is directly used for ozonization of $O_2$, but also an initiator once excited by the electron beam or the ionization radiation may react with $O_2$ gas in the coated film layer, inhibiting the curing reaction. For this reason, it is important to remove $O_2$ gas upon curing the film surface, and in conventional arts, curing is promoted by filling an irradiation zone with an inert gas.

However, the present inventors have revealed that curing of the coated film 14 cannot be sufficiently promoted only by filling the irradiation zone with an inert gas.

Specifically, the present inventors have found that even if the irradiation zone is filled with an inert gas, air remains in the near-surface layer near the surface of the coated film 14, and the remaining air (also referred to as an air adhesion layer) deteriorates curing of the coated film 14. The present inventors have found that such deterioration is particularly great when a thin coated film 14 having a film thickness of 10 μm or less is cured, because if air remains in the layer within 1 mm above the surface of the coated film 14 (hereinafter a near-surface layer), an initiator etc. once excited in the coated film 14 is consumed before being used for curing a thermosetting resin.

Given this, in this embodiment, inert gas is blown to the surface of the coated film 14 using the ultrasonic treatment device 22, thereby generating an ultrasonic wave to be applied to the coated film 14. When an ultrasonic wave energy is applied to the surface of the coated film 14 as herein described, the air in the near-surface layer is vibrated and smoothly replaced by the surrounding inert gas (e.g., $N_2$) as shown in FIG. 3. Accordingly, the near-surface layer of the coated film 14 can be filled with inert gas and the $O_2$ concentration in the near-surface layer can be reduced. At this stage, the $O_2$ concentration of the area within 1 mm above the surface of the coated film 14 can be reduced to 1000 ppm or lower by applying an ultrasonic wave for only a few seconds.

The substrate 12 in which the $O_2$ concentration in the near-surface layer is reduced by means of the ultrasonic treatment device 22 is transferred to the irradiation device 24. In this step, the near-surface layer is exposed to air between the ultrasonic treatment device 22 and the irradiation device 24. However, the inert gas in the near-surface layer which once replaced the air is not easily replaced by air, even if the near-surface layer is exposed to the atmosphere. Thus, the substrate 12 can be transferred to the irradiation device 24 with maintaining the near-surface layer at a low $O_2$ concentration.

The coated film 14 on the substrate 12 transferred to the irradiation device 24 is irradiated with an ionization radiation such as ultraviolet light. At this stage, since the $O_2$ concentration in the near-surface layer is kept low, the polymerization rate in the coated film 14 can be increased, and this ensures more successful curing of the coated film 14. For example, while a conventional device in which the $O_2$ concentration in the near-surface layer is more than 1000 ppm because no ultrasonic wave is used yields a polymerization yield of only 60 to 80%, this embodiment in which the $O_2$ concentration in the near-surface layer is 1000 ppm or less because an ultrasonic wave is used can attain a polymerization yield of 95% or more.

As described above, according to this embodiment, since an ultrasonic wave is applied to the near-surface layer of the substrate 12 with blowing inert gas to the near-surface layer of the substrate 12, air in the near-surface layer can be replaced by inert gas. Accordingly, the $O_2$ concentration in the near-surface layer of the coated film 14 can be reduced, and therefore the coated film 14 can be sufficiently cured by irradiating the film with an ultraviolet light using the irradiation device 22, and finally a coated film 14 having a higher hardness can be obtained. Furthermore, according to this embodiment, since the coated film 14 is easily cured, the amount of inert gas supplied to the irradiation zone need not be increased too much and the amount of the inert gas can be rather decreased. As a result, downsizing and cost reduction of the apparatus for curing a coated film 10 can be achieved. Moreover, since the coated film 14 can be easily cured in this embodiment, the intensity of the ultraviolet light can be lowered to minimize damage on the substrate 12.

Figure 4:
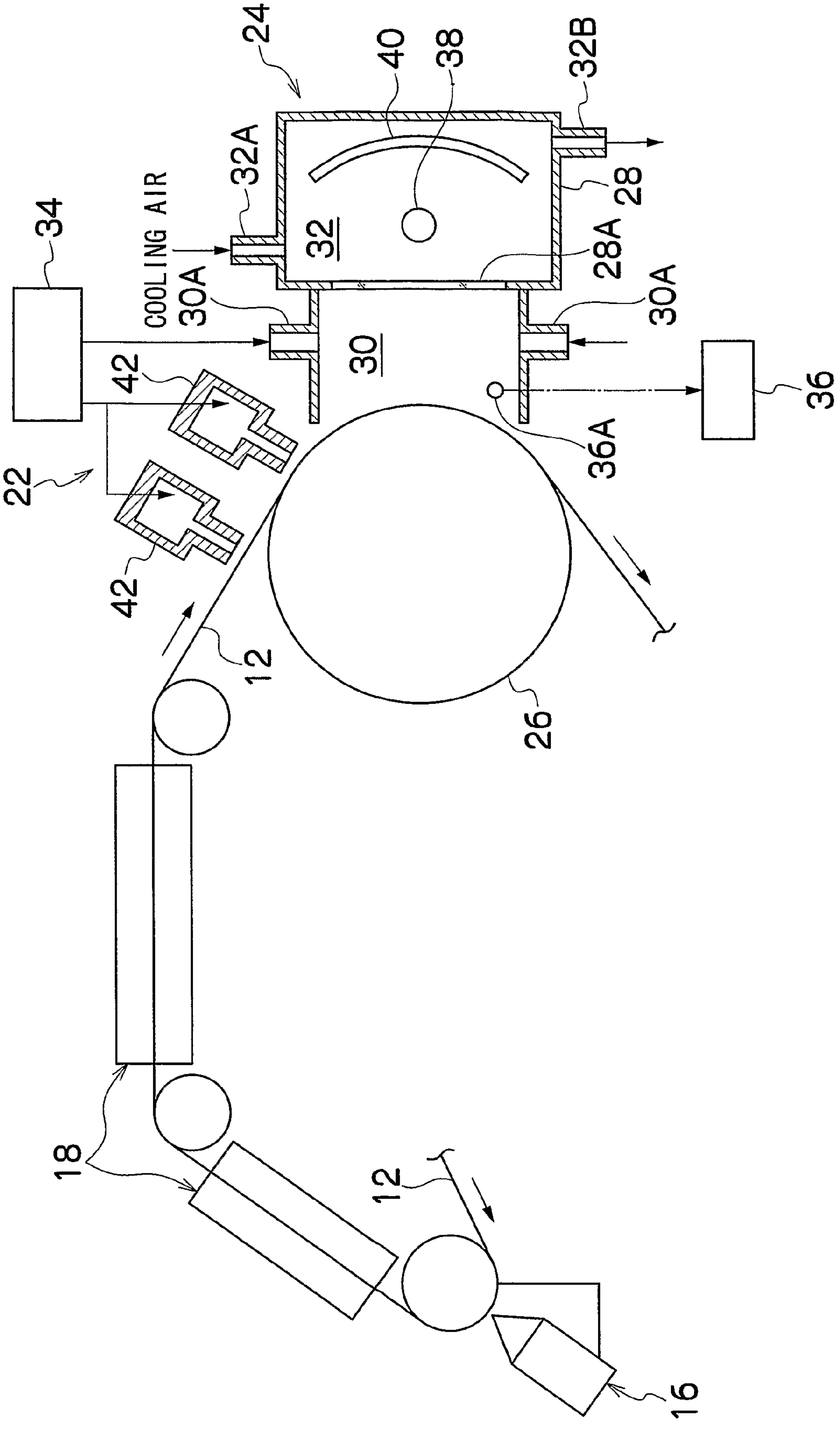
FIG. 4 is a view illustrating an example of an ultrasonic treatment device having a plurality of heads.

Although the ultrasonic treatment device 22 has only one head 42 in the above-described embodiment, the ultrasonic treatment device 22 may also have two or more heads 42. FIG. 4 illustrates an example in which two heads 42, 42 are disposed along the running direction of the substrate 12. When the device is designed as shown in the figure, the replacement reaction between the air and the inert gas in the near-surface layer proceeds more effectively, enabling effective reduction of the $O_2$ concentration in the near-surface layer.

Figure 5:
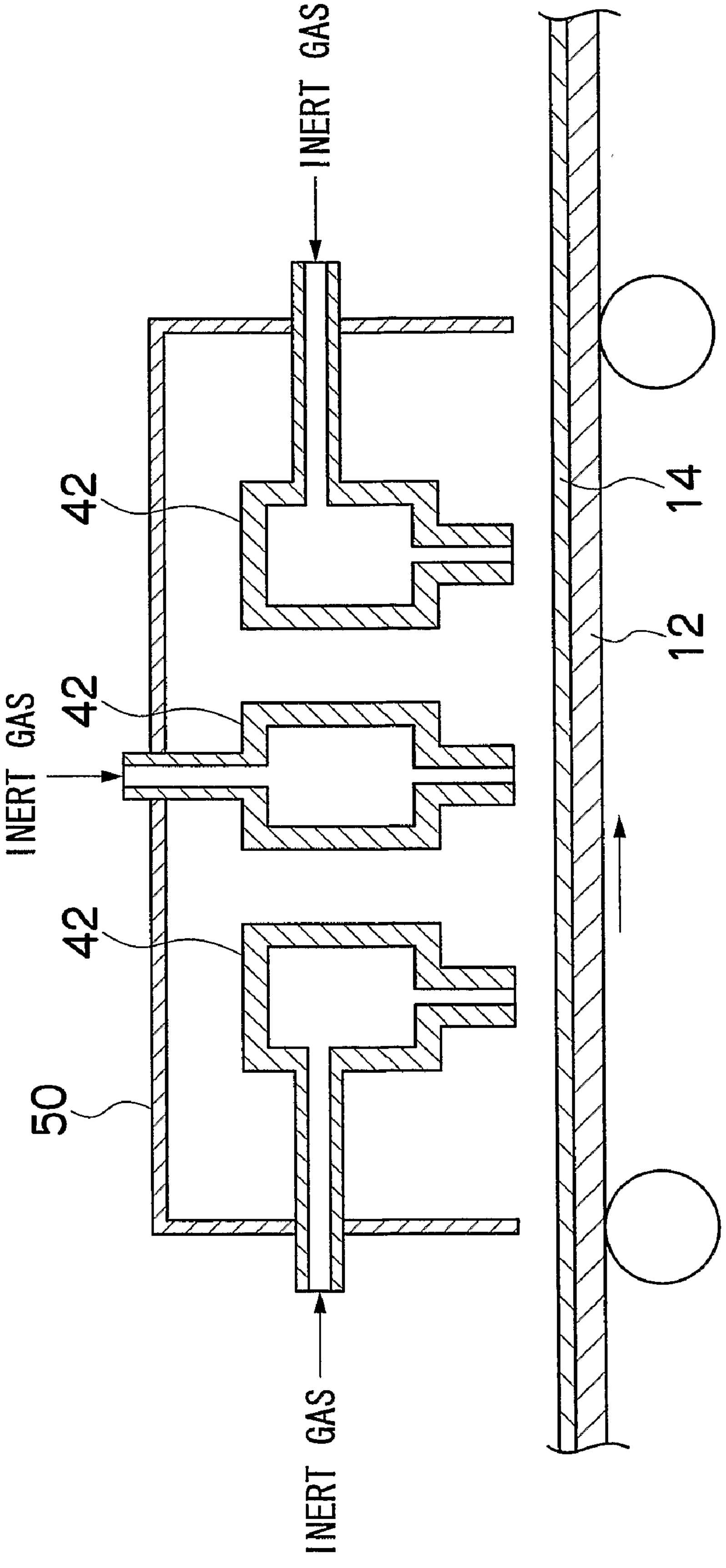
FIG. 5 is a view illustrating an example of an ultrasonic treatment device having a plurality of heads.

FIG. 5 illustrates an example in which three heads 42, 42, 42 are disposed along the running direction of the substrate 12. When the heads 42, 42, 42 are surrounded by a housing 50 and the concentration of the surrounding inert gas is increased, the replacement reaction between the air and the inert gas in the near-surface layer proceeds more effectively. When a plurality of heads 42 are disposed, the amount and the concentration of inert gas supplied to each head 42 may be the same or different. For example, the concentration of inert gas may be higher in a head 42 in further downstream in the running direction of the substrate 12.

Figure 6:
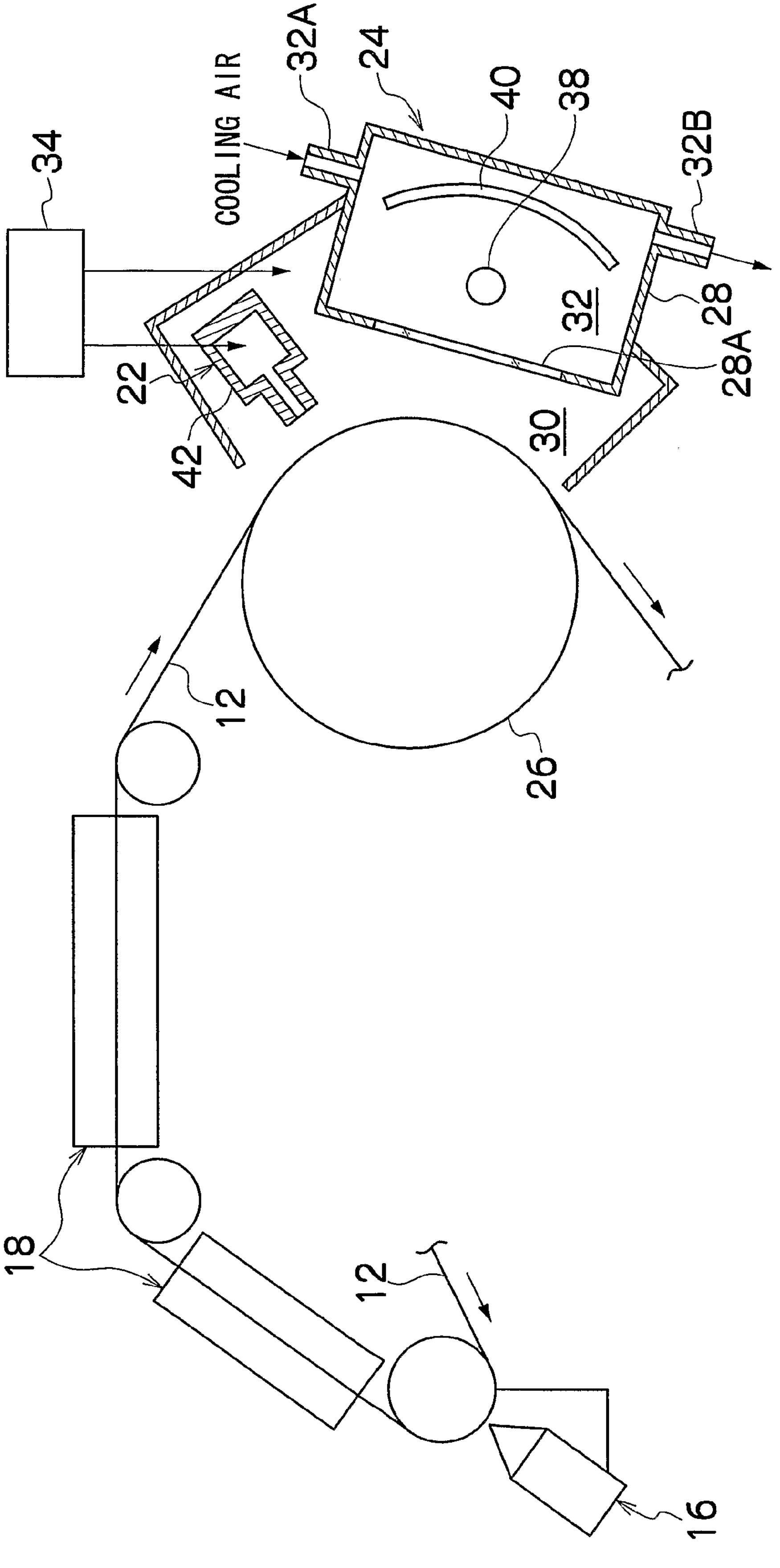
FIG. 6 is a structural view illustrating an apparatus for curing a coated film in which an ultrasonic treatment device is integrated with an irradiation device.

While the ultrasonic treatment device 22 and the irradiation device 24 are separately formed in the above-described embodiment, they may be integrally formed as shown in FIG. 6. In the apparatus for curing a coated film shown in FIG. 6, a head 42 of the ultrasonic treatment device 22 is put inside the irradiation chamber 30 in the housing 28 of the irradiation device 24. Accordingly, the inert gas blown through the head 42 contributes to increase in the concentration of inert gas in the irradiation chamber 30, and therefore the amount of inert gas supplied to the irradiation chamber 30 can be decreased.

Further, while a continuous web substrate 12 is used in the above-described first embodiment, the substrate 12 is not limited thereto, and a short, sheet substrate may also be used.

Figure 7:
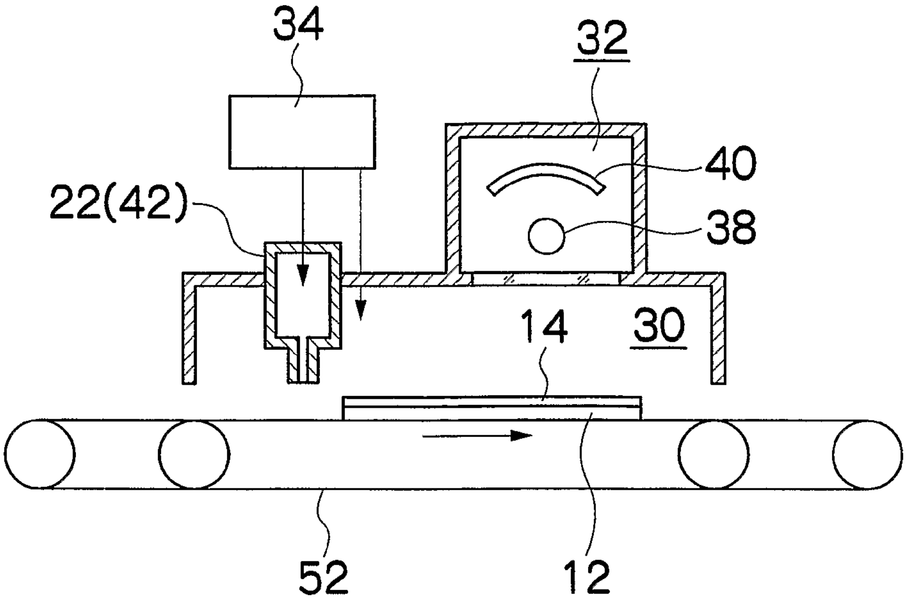
FIG. 7 is a structural view illustrating an apparatus for curing a coated film different from the apparatus shown in FIG. 6.

FIG. 7 illustrates an example of an apparatus for curing a coated film which performs coated film curing treatment for a sheet substrate 12. The substrate 12 is transferred by a belt conveyor 52 and an irradiation device 24 and a head 42 of an ultrasonic treatment device 22 are integrally formed above the belt conveyor 52.

Figure 8:
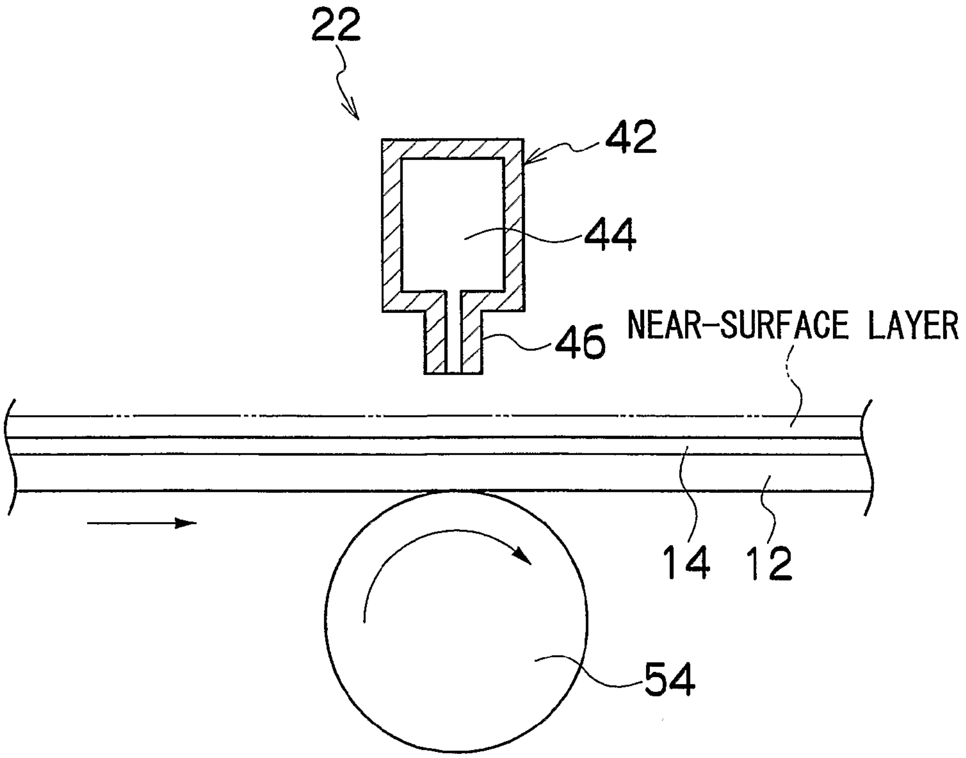
FIG. 8 is a structural view illustrating an apparatus for curing a coated film having a heating means.

FIG. 8 illustrates an example in which a heating roll 54 is disposed on the opposite side of the head 42 across the substrate 12. The surface temperature of the heating roll 54 is controllable by circulating a heating medium inside the roll. The substrate 12 may be heated by the heating roll 54 disposed as herein described. The heating temperature may be controlled so that the temperature of the coated film 14 on the substrate 12 is 25 to 120° C., more preferably 30 to 100° C. When the heating temperature is controlled to such a range, the air in the near-surface layer 14 is easily vibrated by ultrasonic wave, facilitating the replacement reaction between the air and the inert gas.

Figure 9:
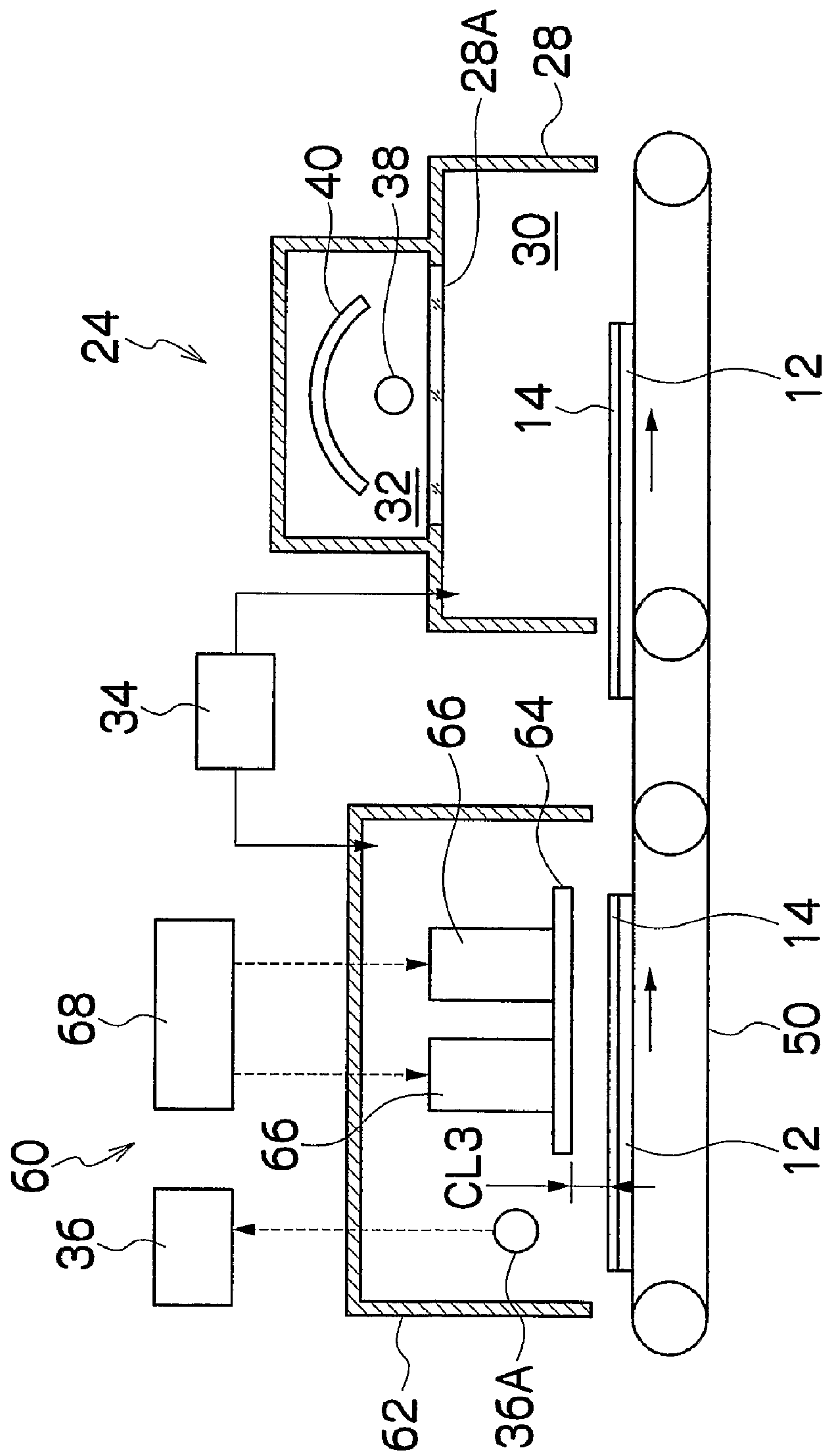
FIG. 9 is a structural view illustrating a second embodiment of the ultrasonic treatment device.

Next, the ultrasonic treatment device 60 according to the second embodiment is described. As shown in FIG. 9, the ultrasonic treatment device 60 according to the second embodiment has a housing 62 opened toward the substrate 12 (downward). A diaphragm 64 made of a metal plate and ultrasonic transducers 66, 66 attached to the diaphragm 64 are provided in the housing 62. An ultrasonic generator 68 is connected to the ultrasonic transducers 66 so as to transmit an ultrasonic wave through the ultrasonic transducers 66.

The diaphragm 64 is disposed in parallel with the coated film 14 on the running substrate 12 close to the coated film 14. The diaphragm 64 and the coated film 14 have a clearance CL3 of preferably 0.1 mm to 10 mm, more preferably 0.3 mm to 5 mm, further preferably 0.5 mm to 3 mm. When the clearance CL3 is greater than the above-described range, the replacement reaction between air and inert gas in the near-surface layer due to the ultrasonic wave is insufficient, and when the clearance CL3 is smaller than the above-described range, the diaphragm 64 may touch the coated film 14 and damage the coated film 14.

The ultrasonic transducer 66 may be a magnetostrictive transducer such as a ferrite element (e.g., a magnetostrictive transducer available from TDK Corporation) or an electrostrictive transducer such as a piezo element. In the case of an electrostrictive ultrasonic transducer 66, the electric energy supplied to the transducer is preferably 10 to 1000 W. The generated ultrasonic wave may have a single frequency or a broad frequency distribution, and a frequency of, for example, 10 to 500 kHz is preferred.

Figure 10:
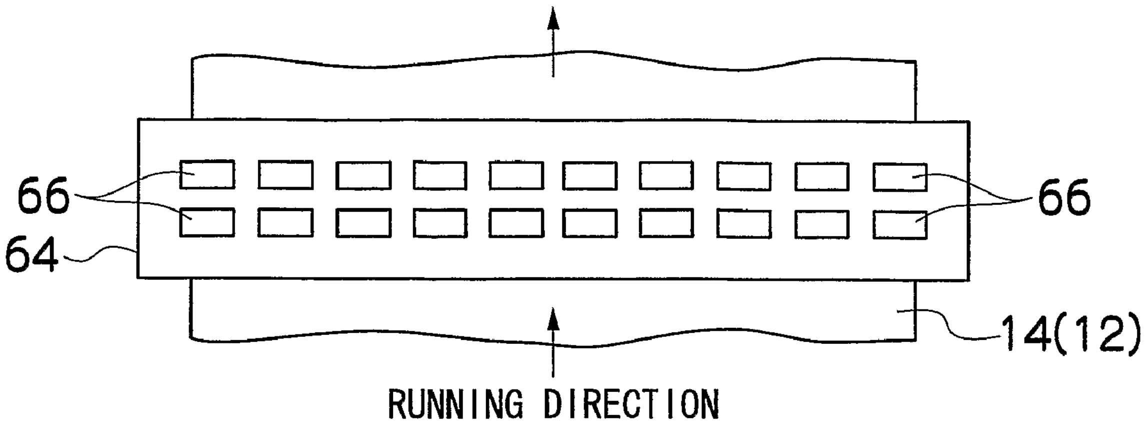
FIG. 10 is a view illustrating the position of ultrasonic transducers.

The ultrasonic transducer 66 and the diaphragm 64 are adhered by a special adhesive so that the vibration in the ultrasonic transducer 66 can be transferred to the diaphragm 64 without attenuation. The number of the ultrasonic transducers 66 is accordingly determined depending on the width or the transfer speed of the substrate 12. For example, as shown in FIG. 10, a plurality of transducers 66 are disposed in two rows in the running direction of the substrate 12 at regular intervals in the width direction.

An inert gas supply unit 34 is connected to the housing 62 in FIG. 9, from which inert gas is supplied to the housing 62, and the housing 62 is filled with the inert gas. The higher the concentration of the inert gas, the better, and the purity of the gas, for example, is preferably 99.9% or higher, more preferably 99.99% or higher, further preferably 99.9999% or higher. A sensor portion 36A of an $O_2$ analyzer 36 is put inside the housing 62, and the inert gas supply unit 34 is operated based on the value measured by the $O_2$ analyzer 36 to control the supply or the concentration of inert gas.

In the second embodiment, the irradiation device 24 has the same configuration as that of the first embodiment shown in FIG. 1.

According to the second embodiment configured as above, the housing 62 is filled with inert gas and an ultrasonic wave is transmitted through the ultrasonic transducer 66 in the housing 62 and applied to the coated film 14 on the substrate 12. The ultrasonic wave makes the air in the near-surface layer within 1 mm above the coated film 14 vibrate and the air is replaced by the surrounding inert gas. As a result, when the coated film 14 is irradiated with ultraviolet light by means of an irradiation device 24, the coated film 14 can be surely cured and a coated film 14 having a high hardness can be obtained.

While the above-described second embodiment illustrates an example in which ultrasonic transducers 66 are provided on the surface side of the substrate 12 (i.e., on the coated film 14 side) and an ultrasonic wave is applied from above the coated film 14, configurations of the position of ultrasonic transducers 66, etc., are not limited thereto, and any configuration can be employed as long as it can give ultrasonic wave energy to the near-surface layer of the coated film 14. Thus, as described in solid lines in FIG. 11, for example, ultrasonic transducers 66 and a diaphragm 64 may also be provided on the backside of the substrate 12 (i.e., opposite from the coated film 14). The air in the near-surface layer of the coated film 14 can be vibrated by an ultrasonic wave and can be replaced by inert gas in this configuration as well.

Figure 11:
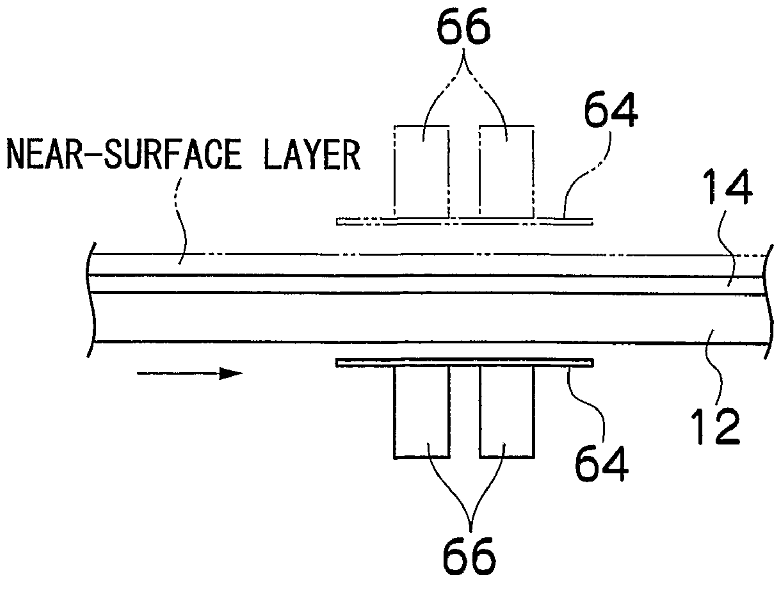
FIG. 11 is a structural view illustrating an ultrasonic treatment device having ultrasonic transducers on the backside of a substrate.

Further, as described in two-dot chain lines in FIG. 11, ultrasonic transducers 66 and a diaphragm 64 may also be provided on the surface side of the substrate 12, so that ultrasonic transducers 66 and a diaphragm 64 are provided on both sides of the substrate 12. This configuration enables application of an ultrasonic wave from both sides of the substrate 12, making the replacement reaction between air and inert gas in the near-surface layer more effective. In that case, the frequency of the ultrasonic wave generated by the ultrasonic transducers 66 may be different on each side of the substrate 12.

Figure 12:
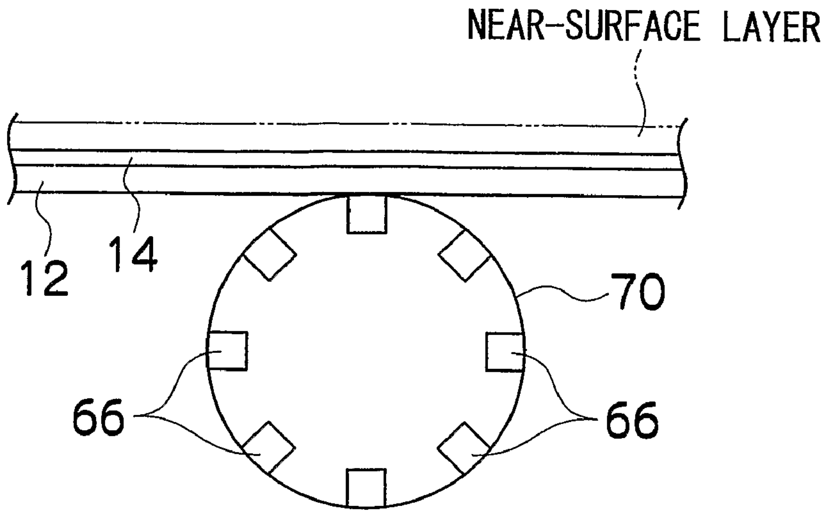
FIG. 12 is a structural view illustrating an ultrasonic treatment device having ultrasonic transducers in a roller.

FIG. 12 illustrates an example in which ultrasonic transducers 66 are provided inside a roller 70. Instead of using the diaphragm 64 (see FIG. 9), an ultrasonic wave is generated by vibrating the surface of the roller 70. The roller 70 in FIG. 12 guides the substrate 12 on the backside (the surface opposite from the coated film 14) and is formed hollow from a metal material. A plurality of ultrasonic transducers 66, 66 . . . are adhered to the inner circumference of the roller 70. The ultrasonic transducers 66, 66 . . . are positioned at regular intervals in the width direction and at regular intervals in the circumferential direction. The roller 70 may be rotatably held to follow the substrate 12 or may be driven, being connected to a motor etc.

With the ultrasonic treatment device configured as above, an ultrasonic wave can be applied to the near-surface layer of the coated film 14 on the substrate 12 by supporting the backside of the substrate 12 by the roller 70. As a result, the air in the near-surface layer can be vibrated by an ultrasonic wave and replaced by the surrounding inert gas. Further, with the above ultrasonic treatment device, since ultrasonic transducers 66, 66 . . . are provided on the roller 70 which comes into direct contact with the backside of the substrate 12, the substrate 12 can be directly vibrated, ensuring vibration of the near-surface layer of the coated film 14. Consequently, the replacement reaction between air and inert gas in the near-surface layer by an ultrasonic wave proceeds more effectively. Moreover, with the above-described ultrasonic treatment device, since the ultrasonic transducers 66, 66 . . . are provided in the roller 70, downsizing of the device can be achieved.

The roller 70 shown in FIG. 12 may also be used as a coating roller 26 (see FIG. 1) of the irradiation device 24. This makes it possible to perform ultrasonic treatment by the roller 70 and irradiation of an ionization radiation by the irradiation device 24 simultaneously.

Figure 13:
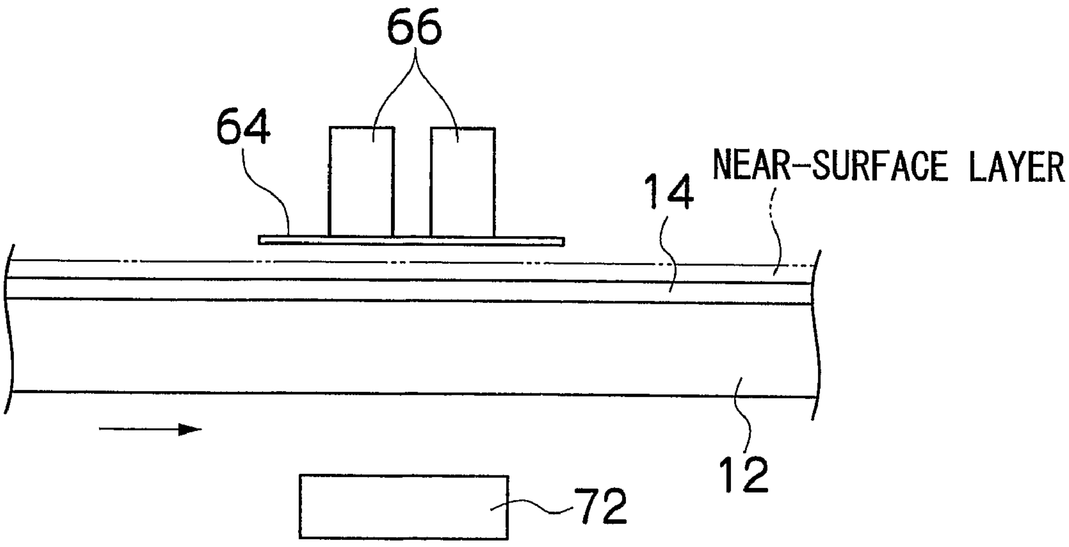
FIG. 13 is a structural view illustrating an apparatus for curing a coated film having a heating means.

FIG. 13 illustrates an example in which a heater 72 is provided on the backside of the substrate 12. In that case, the heater 72 may control the temperature of the near-surface layer of the coated film 14 on the substrate 70 to 25 to 120° C., preferably 30 to 100° C. This facilitates vibration of the air in the near-surface layer by an ultrasonic wave, and so the air in the near-surface layer can be effectively replaced by inert gas.

In the above-described first and second embodiments, a concentration measuring apparatus for measuring $O_2$ concentration in the near-surface layer may be provided in the subsequent stage of the ultrasonic treatment device 22, 60 (i.e., in the downstream in the running direction of the substrate 12). The ultrasonic treatment device 22, 60 may be feedback controlled based on the measurements obtained in the concentration measuring apparatus. Specifically, after reducing the $O_2$ concentration by replacing the air in the near-surface layer of the coated film 14 by inert gas with the ultrasonic treatment device 22, 60, the $O_2$ concentration in the near-surface layer is measured by the concentration measuring apparatus, and the supply and/or the concentration of inert gas from the ultrasonic treatment device 22, 60 may be controlled so that the measured value becomes 1000 ppm or lower.

Figure 14:
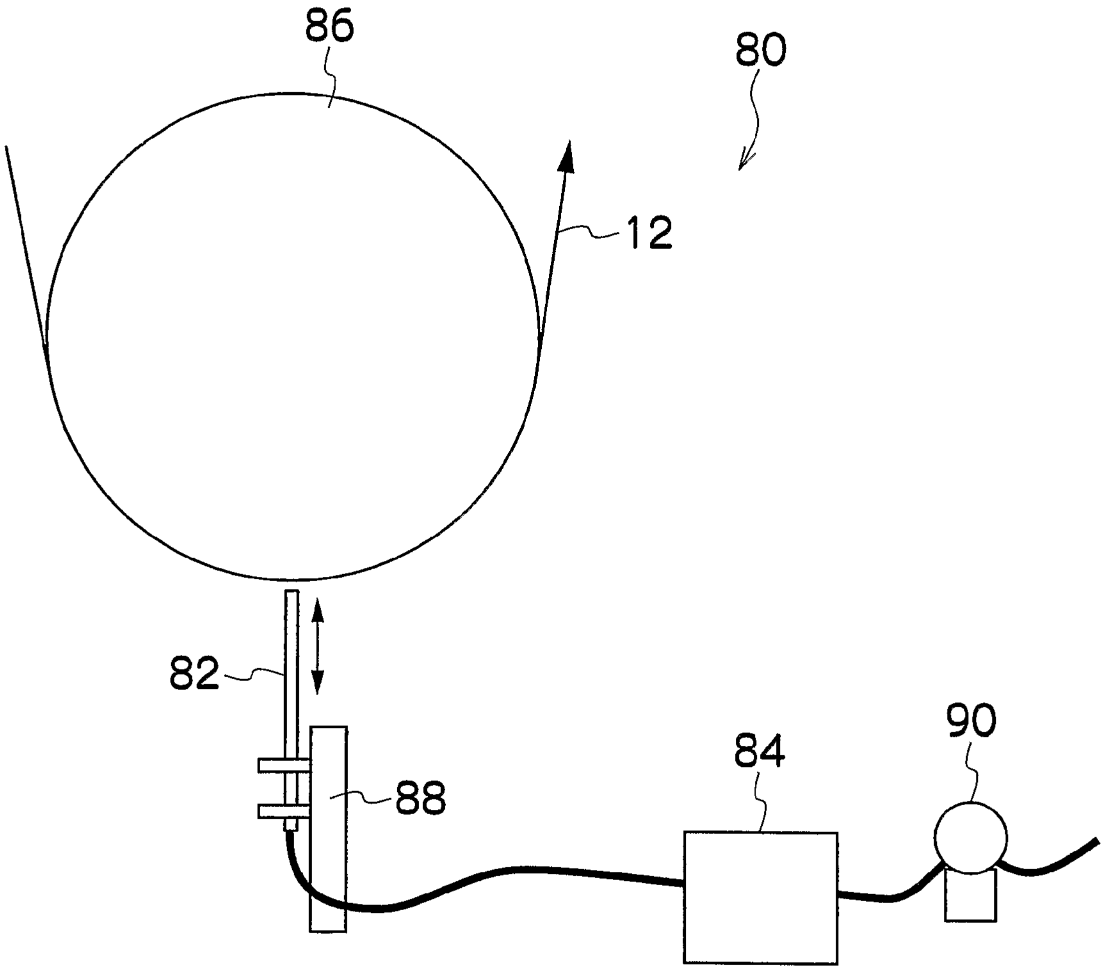
FIG. 14 is a view illustrating a construction of a concentration measuring apparatus.

FIG. 14 is a structural view illustrating an example of a concentration measuring apparatus. The concentration measuring apparatus 80 shown in the figure is composed of an $O_2$ analyzer 84 connected to a suction nozzle 82, a guiding device 88 which moves the suction nozzle 82 back and forth to precisely control the position of the suction nozzle 82 relative to the substrate 12 wound over and held by the roller 86, and a suction pump 90 connected to the suction nozzle 82 via the $O_2$ analyzer 84 which sucks air through the suction nozzle 82. It is preferred that the suction nozzle 82 is positioned near the ultrasonic treatment device 22, 60. For the $O_2$ analyzer 84, "Oxygen Analyzer: Compact-Series Model 3100P" made by Aichi Sangyo Co., Ltd. and "Zirconia Oxygen Analyzer Model LC-300" made by Toray Engineering Co. Ltd. may be used suitably.

In the concentration measuring apparatus 80 configured as above, the suction pump 90 is driven to suck air through the suction nozzle 82, and while the $O_2$ concentration of the air is measured by the $O_2$ analyzer 84, the suction nozzle 82 is moved back and forth relative to the substrate 12 to adjust the measurement position. Based on this mechanism, the $O_2$ concentration in the near-surface layer of the coated film 14 on the substrate 12 can be measured. When the measured value (e.g., an $O_2$ concentration measured value at 1 mm above the coated film 14) in the concentration measuring apparatus 80 exceeds 1000 ppm, the above-described ultrasonic treatment device 22, 60 increases the supply of inert gas from the inert gas supply unit 34, increases the concentration of the inert gas or makes the frequency of generated ultrasonic wave greater. By this operation, the $O_2$ concentration in the near-surface layer can be decreased and controllable to 1000 ppm or lower.

In the above-described first and second embodiments, the ultrasonic treatment device 22, 60 may generate ultrasonic wave at any stage as long as it is after the coated film 14 is formed. However, when the coated film 14 contains a relatively large amount of solvent and the coating solution has a low viscosity, ultrasonic treatment may preferably be performed after passing the film through a drying step to evaporate the solvent as shown in FIG. 1. This is because when the coated film 14 has a low viscosity, the coated film 14 may be disordered by an ultrasonic wave, causing unevenness in thickness. Also, when the coated film 14 is soft and affected by application of an ultrasonic wave, the film may be once irradiated with a weak radiation and then air in the near-surface layer is replaced by inert gas by applying an ultrasonic wave, and thereafter the film may be irradiated with radiation again.

While the air in the near-surface layer of the coated film 14 is replaced by inert gas by ultrasonic treatment in the above-described first and second embodiment, the method is not limited thereto, and any means may be used as long as the $O_2$ concentration in the near-surface layer of the coated film 14 is adjusted to 1000 ppm or lower by replacing the air in the near-surface layer by inert gas.

In the following, details of the irradiation device, the substrate, the coating solution and the coating method used in the present invention are described.

<Radiation>

Any radiation such as EB and UV may be used as long as it cures electron beam/ionization radiation curable resins. Examples of ionization radiations include electron beams having an energy of 50 to 1000 KeV, preferably 100 to 500 KeV emitted from various electron beam accelerators such as a Cockroft-Walton's type, a van de Graaff type, a resonance transformer type, an insulating core transformer type, a linear type, a dynamitron type and a high frequency type accelerator, and ultraviolet light of 50 to 1000 mW/cm$^2$ emitted from light sources such as a ultra-high pressure mercury lamp, a high-pressure mercury lamp, a low-pressure mercury lamp, a carbon arc lamp, a xenon arc lamp and a metal halide lamp. The time for treatment may be 0.1 second to 10 minutes while the time is appropriately determined depending on the kind and the irradiation intensity of electron beam or ionization radiation, the kind and the film thickness of the cured resin and the kind and the amount of initiator and/or sensitizer.

<Irradiation Condition of Radiation>

Irradiation may be performed at any stage after replacing the air in the near-surface layer of the coated film 14 with inert gas by an ultrasonic wave, but since an air adhesion layer is formed again when the film is left in the air for a long time, irradiation may be performed within 10 minutes, preferably within 5 minutes, more preferably within 1 minutes after the replacement. The air in the zone where the film surface is irradiated with an electron beam or an ionization radiation may be replacement with inert gas, and it is obvious that the same level of curing can be achieved with a lower irradiation energy at a lower $O_2$ concentration. In addition, when the temperature of the film surface is somewhat higher upon replacement of the air adhesion layer with inert gas by an ultrasonic wave, the replacement takes place more easily, and the temperature is preferably 25 to 120° C. so as to avoid remarkable elongation or distortion of the substrate.

<Target Substrate>

The substrate may be a continuous web substrate or a sheet substrate (in a sheet from). The material of the substrate may be a plastic film, paper, metal, glass or ceramic. Examples of polymers constituting the plastic film include cellulose ester (e.g., triacetyl cellulose, diacetyl cellulose), polyamide, polycarbonate, polyester (e.g., polyethylene terephthalate, polyethylene naphthalate), polystyrene and polyolefin. They may be surface-treated by corona treatment or base coating, or may have another layer. The substrate may have a thickness of 40 to 200 μm, and in the case of paper, plain paper, wood free paper, coated paper or laminated paper having a thickness of 40 to 200 g/$m^2$ may be used. In the case of metal, aluminum, magnesium, copper, iron, zinc, chromium, nickel or an alloy thereof may be used. Further, a few mm thick printed board and substrates having irregularities on the surface may be used. In addition to flat substrates, those processed into a curved plate, a corrugated plate or a pipe may also be used.

<Coating Solution>

Any coating solution may be used as long as it contains an electron beam/ionization radiation curable resin. The coating solution has a solid concentration of 0.01 to 80% by weight and a viscosity of 0.5 to 1000 cP. The solvent may be an aqueous or an organic solvent. The organic solvent type coating solution may be polymers containing saturated hydrocarbon or polyether as a main chain, or polymers containing saturated hydrocarbon as a main chain. It is preferred that the binder polymer is cross-linked, and polymers containing saturated hydrocarbon as a main chain is obtained by a polymerization reaction of an ethylenically unsaturated monomer. To obtain a cross-linked binder polymer, a monomer containing two or more ethylenically unsaturated groups may be used.

Examples of monomers containing two or more ethylenically unsaturated groups include esters of polyhydric alcohol and (meth)acrylic acid (e.g., ethylene glycol di(meth)acrylate, 1,4-dicyclohexane diacrylate, pentaerythritol tetra (meth)acrylate, pentaerythritol tri(meth)acrylate, trimethylolpropane tri(meth)acrylate, trimethylolethane tri(meth) acrylate, dipentaerythritol tetra(meth)acrylate, dipentaerythritol penta(meth)acrylate, pentaerythritol hexa (meth)acrylate, 1,2,3-cyclohexane tetramethacrylate, polyurethane polyacrylate, polyester polyacrylate), vinylbenzenes and derivatives thereof (e.g., 1,4-divinylbenzene, 4-vinylbenzoic acid-2-acryloylethyl ester, 1,4-divinylcyclohexanone), vinyl sulfones (e.g., divinyl sulfone), acrylamides (e.g., methylene bisacrylamide) and metacrylamides.

It is preferred that polymers containing polyether as a main chain may be synthesized by ring opening polymerization of a multifunctional epoxy compound. The above monomers containing ethylenically unsaturated groups need to be cured by a polymerization reaction using an ionization radiation or heat after application. The above describes examples of UV curable hard coat. In the following, an example of heat curable hard coat will be described.

In addition to monomers containing two or more ethylenically unsaturated groups, a cross-linking structure may be introduced into the binder polymer based on a reaction of a cross-linkable group. Examples of cross-linkable functional groups include an isocyanato group, an epoxy group, an aziridine group, an oxazoline group, an aldehyde group, a carbonyl group, a hydrazine group, a carboxyl group, a methylol group and an active methylene group. Vinyl sulfonic acid, acid anhydride, cyanoacrylate derivatives, melamine, etherified methylol, ester, urethane and metal alkoxide such as tetramethoxysilane may also be used as a monomer for introducing a cross-linking structure. A functional group which exhibits a cross-linking ability after a decomposition reaction, such as a block isocyanate group, may also be used. Further, in the present invention, the cross-linkable group is not limited to the above compounds and the above functional groups which has become reactive after decomposition may also be used. These compounds containing a cross-linkable group need to be cross-linked by heat after application.

When formed into an anti-glare layer, the coating solution may contain a high refractive index monomer or high refractive index inorganic fine particles in addition to the above-described materials. Examples of high refractive index monomers include bis(4-methacryloylthiophenyl)sulfide, vinylnaphthalene, vinyl phenyl sulfide and 4-methacryloxyphenyl-4'-methoxyphenyl thioether.

Regarding high refractive index inorganic fine particles, fine particles of an oxide of at least one element selected from titanium, aluminum, indium, zinc, tin and antimony, having a particle size of 100 nm or less, preferably 50 nm or less, may be contained. Examples of fine particles include $TiO_2$, $Al_2O_3$, $In_2O_3$, ZnO, $SnO_2$, $Sb_2O_3$ and ITO. Further, among silica particles, hollow silica may also be used. Hollow silica fine particles are prepared by closing the opening of pores by covering the surface of porous silica fine particles with an organic silicon compound. Hollow silica fine particles having an average particle size of 0.5 to 200 nm are often used.

Inorganic fine particles may be added in a proportion of preferably 10 to 90% by weight, more preferably 20 to 80% by weight based on the total weight of the hardcoat layer. Further, matt particles of resin or an inorganic compound may also be added. The matt particles have an average particle size of preferably 1.0 to 10.0 μm, more preferably 1.5 to 5.0 μm.

In addition, a fluorinated compound cross-linkable by heat or ionization radiation may also be used. Examples of cross-linkable fluoropolymers include silane compounds containing a perfluoroalkyl group (e.g., (heptadecafluoro-1,1,2,2-tetradecyl)triethoxysilane) and fluorinated copolymers composed of a fluorinated monomer and a monomer for producing a cross-linkable group as structural units.

Examples of fluorinated monomer units include fluoroolefins (e.g., fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (e.g., Biscoat 6FM available from OSAKA ORGANIC CHEMICAL INDUSTRY LTD., M-2020 available from DAIKIN INDUSTRIES, LTD.) and partially or completely fluorinated vinyl ethers.

Examples of monomers for producing a cross-linkable group include (meth)acrylate monomers such as glycidyl methacrylate already containing a cross-linkable functional group in the molecule, and (meth)acrylate monomers containing a carboxyl group, a hydroxyl group, an amino group or a sulfonic acid group (e.g., (meth)acrylic acid, methylol (meth)acrylate, hydroxyalkyl(meth)acrylate and allyl acrylate). Japanese Patent Laid-Open Nos. 10-25388 and 10-147739 describes that the latter is capable of introducing a cross-linking structure after polymerization.

In addition to the above-described polymers containing a fluorinated monomer as a structural unit, a copolymer with a monomer containing no fluorine atom may also be used. The monomer unit that can be used together is not particularly limited, and examples thereof include olefins (ethylene, propylene, isoprene, vinyl chloride, vinylidene chloride, etc.), acrylic esters (methyl acrylate, ethyl acrylate, 2-ethylhexyl acrylate), methacrylic esters (methyl methacrylate, ethyl methacrylate, butyl methacrylate, ethylene glycol dimethacrylate, etc.), styrene derivatives (styrene, divinylbenzene, vinyltoluene, and α-methylstyrene, etc.), vinyl ethers (methyl vinyl ether, etc.), vinyl esters (vinyl acetate, vinyl propionate, vinyl cinnamate, etc.), acrylamides (N-tert-butylacrylamide, N-cyclohexylacrylamide, etc.), methacrylamides and acrylonitrile derivatives.

Referring to photocuring agents used particularly in ultraviolet light curing techniques, examples thereof include acetophenones such as di- or trichloroacetophenone, benzophenone, Michler's ketone, benzyl, benzoin, benzoin alkyl ether, benzyl dimethyl ketal, tetramethylthiuram monosulfide, thioxanthone, azo compounds and onium salts. An appropriate compound is selected depending on the types of the polymerization reaction of ultraviolet curable silicone resin and ultraviolet curable resin, stability and suitability to the ultraviolet irradiation device. It is preferred that the photoinitiator is used in a proportion of usually 0.1 to 5% by weight based on the ultraviolet curable silicone resin or the ultraviolet curable resin. The photoinitiator may be used together with a storage stabilizer such as hydroquinone.

Further, the following sensitizer may be used together: aliphatic amines, amines containing an aromatic group, nitrogen heterocyclic compounds, allylurea, o-tolylthiourea, sodium diethyl dithiophosphate, soluble salts of aromatic sulfonic acid, N,N-di-substituted-p-aminobenzonitrile compounds, tri-n-butylphosphine, sodium diethyl thiophosphate, Michler's ketone, N-nitrosohydroxylamine derivatives, oxazoline compounds, carbon tetrachloride, hexachloroethane and the like. When such a sensitizer is used in combination with a photoinitiator, the curing rate can be generally improved.

<Solvent>

Although not essential, a solvent may be used for ensuring coatability. Examples thereof include water, alcohols such as methanol, ethanol, propanol and butanol, ketones such as acetone, methyl ethyl ketone, methyl isobutyl ketone and cyclohexanone, halogenated hydrocarbons such as chloroform and carbon tetrachloride, aromatic hydrocarbons such as benzene and toluene, cellosolves such as ethylene glycol methyl ether, ethyl ether and butyl ether, esters such as ethyl acetate and ethyl chloroacetate, and cyclic ethers such as dimethylformamide and tetrahydrofuran. Further, a colorant, a thermal polymerization inhibitor, a plasticizer or the like may be added according to need.

<Coating Method>

The coating method is not particularly limited, and any wet coating and printing methods such as extrusion coating, slide coating, curtain coating, bar coating, gravure coating, reverse gravure coating, roll coating, reverse roll coating, comma coating, blade coating, air knife coating, dip coating, spray coating, atomization coating, spin coating, gravure printing and screen printing may be applied.

<Reverse Gravure Form>

Referring to the reverse gravure form in the coating method, the following can be employed: gravure roll diameter: 20 to 300 mm, mesh #50 to #500, gravure form: trihelical, quadrangular or pyramidal, gravure roll material: iron core plated with HCr or with nickel and HCr, rotational speed relative to transfer speed of substrate: roll speed/substrate speed=0.01 to 10, wrap angle: 0 to 20 degrees.

<Shape of Die>

Referring to the shape of the die in the coating method, the die has a slit CL of 50 to 500 μm, a lip CL of 30 to 300 μm, an upper lip length of 30 to 1000 μm, a lower lip length of 300 to 1000 μm, an upper lip surface roughness of 0.8 S or lower, and an overbite of 0 to 100 μm. The width of the die may range from 100 mm which is a tester level to 500 mm or more which is a manufacturing machine level.

<Coating Roll>

Referring to the coating roll, the roll may have a diameter of 100 mm to 400 mm depending on the width of the die. The roll has a surface roughness of 0.8 S or lower. In the case of a coating roll made of metal such as iron, the surface may be plated with HCr. A roll made of ceramic may also be used.

EXAMPLE

Coating Condition

Coating was continuously performed using a die having a suction device. A die having a slit CL of 200 μm, a lip CL of 100 μm, an upper lip length of 50 μm, a lower lip length of 1000 μm, an upper lip surface roughness of 0.3 S, an overbite of 100 μm and a width of 1000 mm was used.

A coating roll 200 mm in diameter whose surface was plated with HCr and having a surface roughness of 0.3 S was used. For the suction condition, the degree of vacuum was 0.05 to 1.0 kPa. A support (substrate) made of PET having a thickness of 100 μm and a width of 1100 mm was used. A coating solution contained acrylic resin in MEX or cyclohexanone as solvent with an initiator and a slight amount of a sensitizer and had a viscosity of 5 cp and a surface tension of 25 dyn/cm. The coating amount was 7.5 cc/$m^2$.

<Drying Conditions>

The drying conditions were as follows: drying method: hot/warm air drying; air speed: 0.1 m/sec, and drying temperature: air temperature of 50 to 120° C.

<Ultraviolet Light Irradiation Conditions>

The ultraviolet light irradiation conditions were as follows: type of lamp: metal halide lamp; lamp output: 200 mW/cm; illuminance: 450 mW/$cm^2$; dose: 500 mJ/$cm^2$; timing of irradiation: 1 second after ultrasonic removal of the air adhesion layer; $O_2$ concentration in irradiation atmosphere: 250 ppm; and irradiation time: 1 second.

<Pencil Hardness Evaluation>

The hardness of samples obtained by coating, drying and curing by ultraviolet light under the above-described conditions was measured in accordance with JIS K5400.

Example 1

Regarding conditions of the ultrasonic treatment, the generation mode was slit injection (ultrasonic transducer), the frequency/sound pressure was 20 to 100 kHz/100 dB, and the supply of inert gas/purity was 10 $m^3$/minute, $N_2$ of 99.999% or higher. The transducer was set 5 mm above the film surface and it was treated for 5 seconds.

A coated film was prepared under the above-described coating condition and transferred through a warm air drying zone at 100° C. for about 1 minute. Then, the $O_2$ concentration of the atmosphere was set to 250 ppm and the air adhesion layer was removed using inert gas by a slit injection type ultrasonic generator, and the film was irradiated with ultraviolet light after 1 second. The hardness of the obtained sample was measured to be 3H. The polymerization yield in the coated film at this stage was 90%.

Example 2

A sample was prepared in the same manner as in Example 1 except that the ultrasonic transducer was set 1 mm above the film surface, and the film hardness was measured. As a result, the hardness was 5H. The polymerization yield in the coated film at this stage was 97%.

Example 3

A sample was prepared in the same manner as in Example 2 except that the time for the ultrasonic treatment was changed to 1 second, and the film hardness was measured. As a result, the hardness was 4H. The polymerization yield in the coated film at this stage was 95%.

Example 4

The same ultrasonic treatment as that of Example 1 were repeated twice and the film hardness of the obtained sample was measured. As a result, the hardness was 4H. The polymerization yield in the coated film at this stage was 95%.

Example 5

A sample was prepared in the same manner as in Example 1 except that the sound pressure of the ultrasonic wave was changed to 150 dB and the film hardness of the obtained sample was measured. As a result, the hardness was 4H. The polymerization yield in the coated film at this stage was 95%.

Example 6

An ultrasonic transducer was disposed 5 mm above the surface of a coated film prepared in inert gas atmosphere having an $O_2$ concentration of 250 ppm in the same manner as in Example 1, and an ultrasonic wave having a frequency of 40 kHz and a sound pressure of 150 dB was applied to the film. Subsequently, the film hardness of a sample obtained by irradiating with ultraviolet light as in Example 1 was measured. As a result, the hardness was 2H. The polymerization yield in the coated film at this stage was 85%.

Example 7

The film was heated by a ceramic heater from the backside when the ultrasonic wave was applied as in Example 6. The surface temperature of the coated film at this stage was 80° C. The film hardness of the obtained sample was measured to be 3H. The polymerization yield in the coated film at this stage was 90%.

Example 8

A sample was prepared by irradiating a film with an ultrasonic wave (sound pressure: 150 dB) in an inert gas atmosphere having an $O_2$ concentration of 250 ppm as in Example 6, then transferring the film through the inert gas atmosphere for about 5 seconds, and irradiating the film with ultraviolet light as in Example 1. The film hardness of the obtained sample was measured. As a result, the hardness was 3H. The polymerization yield in the coated film at this stage was 90%.

Comparative Example 1

Coating and irradiation of electron beam/ionization radiation were performed under the same conditions as in Example 1 except that the ultrasonic wave was not applied. As a result, the film hardness was B or lower. The polymerization yield in the coated film at this stage was 50%.

Comparative Example 2

An experiment was performed under the same conditions as in Example 1 except that the electron beam/ionization radiation was applied after inert gas was blown to the film surface at 100 m/s using a slit nozzle without applying ultrasonic wave. As a result, the film hardness was B. The polymerization yield in the coated film at this stage was 55%.

Comparative Example 3

An experiment was performed under the same conditions as in Example 1 except that the electron beam/ionization radiation was applied after inert gas was blown to the film surface at 100 m/s using a slit nozzle without applying ultrasonic wave and the temperature of the film surface at that stage was adjusted to 50° C. using a ceramic heater. As a result, the film hardness was HB. The polymerization yield in the coated film at this stage was 65%.

Comparative Example 4

An experiment was performed under the same conditions as in Example 1 except that the electron beam/ionization radiation was applied after inert gas was blown to the film surface at 100 m/s using a slit nozzle without applying ultrasonic wave and the temperature of the film surface at that stage was adjusted to 150° C. using a ceramic heater. As a result, the film hardness was 2H. The polymerization yield in the coated film at this stage was 75%. However, the substrate was wrinkled because it was heated.

As seen from the above results, in Comparative Examples 1 to 4 in which no ultrasonic wave was applied, it was difficult to increase the hardness of the coated film and the polymerization yield in the coated film. Even if the hardness and the polymerization yield were improved, another defect such as generation of wrinkles occurred.

On the other hand, in Examples 1 to 8 in which an ultrasonic wave was applied, the hardness of the coated film was as high as 2H or more and the polymerization yield was as high as 85% or more. Further, as seen in Examples 1 to 5, in the slit injection type ultrasonic generator, the hardness and the polymerization yield of the coated film could be improved by bringing the nozzle closer to the coated film, extending the time for ultrasonic treatment, increasing the number of ultrasonic treatment or increasing the sound pressure of the ultrasonic wave. Likewise, as seen in Examples 6 to 8, in an ultrasonic transducer type apparatus, the hardness and the polymerization yield of the coated film could be improved by heating or by increasing the residence time in inert gas.

The invention claimed is:

1. A method for curing a coated film, including irradiating a coated film of an ionization radiation curable resin applied to a substrate with an ionization radiation, thereby curing the coated film, the method comprising:

irradiating ultrasonic wave onto the coated film to adjust an $0_2$ concentration in a near-surface layer within 1 mm above a surface of the coated film 1000 ppm or lower;

and irradiating the ionization radiation to the coated film.

2. The method for curing a coated film according to claim 1, characterized in that the curing of the coated film is performed in an inert gas atmosphere.

3. The method for curing a coated film according to claim 2, characterized in that the irradiation of ultrasonic wave is performed by blowing an inert gas onto the surface of the coated film at 0.5 to 50 $m^2$/minute per m of width.

4. The method for curing a coated film according to claim 2, characterized in that the blowing of the inert gas is performed by supplying the inert gas through a slit to be blown onto the surface of the coated film.

5. The method for curing a coated film according to claim 1, characterized in that the ultrasonic wave has a sound pressure of 10 to 500 dB and a frequency of 10 to 500 kHz.

6. The method for curing a coated film according to claim 5, characterized in that the irradiation of ultrasonic wave is performed by using an ultrasonic transducer and a diaphragm equipped with the ultrasonic transducer.

7. The method for curing a coated film according to claim 1, characterized in that the surface temperature of the coated film is adjusted to 25 to 120° C. upon the irradiation of the ionization radiation.

* * * * *